US012017742B2

(12) United States Patent
Taylor et al.

(10) Patent No.: US 12,017,742 B2
(45) Date of Patent: Jun. 25, 2024

(54) CAVITATION AND NOISE REDUCTION IN AXIAL FLOW ROTORS

(71) Applicant: Oscar Propulsion Ltd., Guildford (GB)

(72) Inventors: David Taylor, Guildford (GB); Batuhan Aktas, Guildford (GB); Mehmet Atlar, Guildford (GB)

(73) Assignee: Oscar Propulsion Ltd., West Sussex (GB)

(*) Notice: Subject to any disclaimer, the term of this patent is extended or adjusted under 35 U.S.C. 154(b) by 113 days.

(21) Appl. No.: 16/612,591

(22) PCT Filed: May 11, 2018

(86) PCT No.: PCT/GB2018/051280
§ 371 (c)(1),
(2) Date: Nov. 11, 2019

(87) PCT Pub. No.: WO2018/206978
PCT Pub. Date: Nov. 15, 2018

(65) Prior Publication Data

US 2021/0199012 A1 Jul. 1, 2021

(30) Foreign Application Priority Data

May 11, 2017 (GB) ..................................... 1707565

(51) Int. Cl.

| | |
|---|---|
| ***B63H 1/18*** | (2006.01) |
| ***F01D 5/02*** | (2006.01) |
| ***F04D 29/66*** | (2006.01) |

(52) U.S. Cl.
CPC ............... *B63H 1/18* (2013.01); *F01D 5/021* (2013.01); *F04D 29/669* (2013.01); *F05D 2240/20* (2013.01)

(58) Field of Classification Search
CPC .. B63H 1/18; B63H 1/28; F04D 29/38; F04D 29/661; F04D 29/667; F04D 29/669
See application file for complete search history.

(56) References Cited

U.S. PATENT DOCUMENTS

| | | | | |
|---|---|---|---|---|
| 241,124 A * | 5/1881 | Deane | B63H 1/28 | 416/231 R |
| 1,066,988 A * | 7/1913 | Boutwell | F01D 5/145 | 416/231 R |

(Continued)

FOREIGN PATENT DOCUMENTS

| | | |
|---|---|---|
| CN | 102705264 A | 10/2012 |
| CN | 202991623 U | 6/2013 |

(Continued)

OTHER PUBLICATIONS

Aktas, Batuhan. "A Systematic Experimental Approach to Cavitation Noise Prediction of Marine Propellers". Newcastle University, Aug. 2016 (Year: 2016).*

(Continued)

*Primary Examiner* — Christopher R Legendre
(74) *Attorney, Agent, or Firm* — Hall Estill Law Firm

(57) ABSTRACT

A propeller, impeller or mixer comprising at least one blade, the blade having a suction surface and a pressure surface which extend from a leading edge to a trailing edge of the blade and a radially-outer tip region, wherein five to one hundred duct openings are provided extending through the at least one blade from the pressure surface to the suction surface, the duct openings being grouped in the tip region of the blade.

21 Claims, 6 Drawing Sheets

(56) References Cited

U.S. PATENT DOCUMENTS

| | | | | |
|---|---|---|---|---|
| 4,714,408 | A * | 12/1987 | Abe | F04D 29/38 416/231 R |
| 5,083,950 | A | 1/1992 | Suhrbier | |
| 6,846,365 | B2 * | 1/2005 | Madanshetty | F04D 29/669 134/1 |
| 2021/0199012 | A1 * | 7/2021 | Taylor | B63H 1/18 |

FOREIGN PATENT DOCUMENTS

| | | | | |
|---|---|---|---|---|
| CN | 103612733 | B | 5/2014 | |
| CN | 104093628 | B | 8/2014 | |
| CN | 104454641 | A | 3/2015 | |
| CN | 107313979 | B | 11/2017 | |
| FR | 2507562 | A | 12/1982 | |
| FR | 2507562 | A1 * | 12/1982 | B63H 1/28 |
| GB | 293656 | A | 7/1928 | |
| JP | S48163396 | A | 9/1983 | |
| JP | 58163396 | U * | 10/1983 | |
| JP | 59005804 | A * | 1/1984 | B63H 1/18 |
| JP | S61148794 | A | 7/1986 | |
| JP | 61148794 | U * | 9/1986 | |
| JP | 07243397 | A * | 9/1995 | |
| JP | 1995243397 | A | 9/1995 | |
| JP | 2005240749 | A | 9/2005 | |
| JP | 2008062683 | A | 3/2008 | |
| WO | 1998046482 | A1 | 10/1998 | |

OTHER PUBLICATIONS

S. D. Sharma, K. Mani and R. Arakeri, "Cavitation Noise Studies on Marine Propellers," Journal of Sound and Vibration, 1990, pp. 255-283, 138(2), Academic Press Limited.

* cited by examiner

CAVITATION AND NOISE REDUCTION IN AXIAL FLOW ROTORS

RELATED APPLICATIONS

The present application makes a claim of priority to International Application PCT/GB2018/051280 filed May 11, 2018, which in turn makes a claim of priority to GB Application No. GB1707565.6 filed May 11, 2017.

BACKGROUND

The present invention relates to axial flow rotors, and in particular propellers, and impellers. Propellers are types of fan that transmit power by converting rotational motion into thrust. They are the most common form of device for propelling boats, ships and aircraft, but can also be found in devices such as mixers and impellers.

Propellers also exist to drive air in the form of fan blowers.

Propellers consist of a number of blades arranged around a hub. The blades are angled and shaped such that when the hub is turned by the drive shaft connected to the craft's motors, they rotate and "screw" their way through a fluid (typically water or air).

The blades can be aerofoil shaped. As the propeller rotates, a pressure difference forms between the forward facing and rear facing surfaces of the blades and the fluid is accelerated behind the blade. The rear facing side is the high pressure side. This pressure difference propels the craft.

The faster the propeller rotates, the lower the pressure becomes on the low pressure side of the blade. Cavitation occurs when the pressure on the low pressure side of the blade, or at the blade tips, drops below the vapour pressure of the water leading to vapour pockets forming.

This can cause damage to the propeller on the low pressure side of the blade and at the tips when the pockets of vapour collapse in the presence of higher pressure fluid. The collapse can be highly energetic generating shock waves which erode the material of the blade. Local pressures of 30,000 pounds per square inch (2068 bar) can be generated.

Cavitation can also waste power, create vibration and lead to increased wear. It also is a major source of underwater radiated noise. Underwater radiated noise (URN) has now been recognized as a serious environmental pollution problem, in which sea fauna such as fish and whales can become disoriented and less able to communicate. Laws are being introduced to enforce lower marine noise pollution by vessels and there are proposals to vary the fees that vessels are charged to enter ports depending on their noise performance. Thus, there is a need to find ways of reducing URN.

Cavitation damage can also occur to the hulls and rudders of ships as the high speed water from the propeller induces cavitation on their surfaces. Cavitation damage can also occur on the interiors of pipes and on the walls of piston cylinders in engines.

To date the only effective remedy to cavitation on ship or boat propellers has been to either limit the speed of the propellers or design their shapes to be less prone to cavitation. Ship or boat propellers could be much more efficient if they could run at higher speeds without the risk of cavitation and without their having to be shaped specially to reduce cavitation. The same applies to pump impellers. Other methods have been developed which are described next.

U.S. patent application Ser. No. 07/454,316 describes an apparatus for reducing cavitation erosion by discharging a stream of gas positioned upstream and adjacent to the propeller in a direction perpendicular to the oncoming flow and at a lateral position relative to the propeller rotation axis. The gas stream is intended to prevent the formation of the low pressure areas which lead to cavitation. The disadvantage of this apparatus is that it requires a separate pumping system to introduce the air.

Norwegian patent specification number 40419 describes a method and means to prevent cavitation erosion in propeller ducts by introducing a stream of air into the flow of water adjacent to the propeller duct. A propeller duct a cylindrical cavity in which the propeller can rotate. The disadvantages of this are that it requires a separate pumping system to introduce the air and it only provides protection to the propeller duct, not to the propeller.

The paper: "Cavitation noise studies on marine propellers" by S. D. Sharma et al., J. Sound and Vibration (1990), 138 (2), pp. 255-283, discusses factors affecting cavitation and the noise generated by cavitation, and included noise measurements on a propeller modified by drilling 300 closely and uniformly spaced 0.3 mm holes in the tip area of each of the blades to delay tip vortex cavitation. Such a modification is, however, impractical to manufacture and so has not been pursued. Further, these experiments were conducted in uniform flow conditions (i.e. not behind a hull which generates non-uniform flow), and there is therefore a need to find arrangements suitable for the real world conditions where propellers operate in different flow conditions to those used in the Sharma paper.

SUMMARY

The present invention is a means of preventing or reducing cavitation and cavitation noise in a propeller or impeller. In accordance with the invention, in a marine propeller, the propeller blades contain a number of openings which pass between the high pressure side of the blade and the low pressure side of the blade. The openings on the low pressure side are close to, or in, areas where cavitation is likely to occur particularly the tip regions, and it has surprisingly been found that placing fewer holes than the 300 per blade used by Sharma in the tip regions (the outer radii of the blades) has a significant effect on noise reduction with only a minimal effect on efficiency even in non-uniform flow conditions. Holes placed elsewhere may contribute to noise reduction but have a bigger penalty in reducing efficiency.

It will be understood that, in the following specification, the terms "ducts", "duct openings" and "holes" all refer to passages from one side of the blade to the other, and can be used interchangeably. It will also be understood that, where propellers are described, the same may also apply to impellers, ducted fans, and other types of axial flow rotors.

Ducts can also be provided to the tips of the blade so that they open either on the tip edge in a direction generally radial to the axis of rotation or close to the tip on either the high pressure or low pressure sides of the blades. These ducts are connected to the openings on the high pressure side of the blade typically, although they could also be connected to ducts on the low pressure side of the blade.

The ducts are designed to channel relatively small amounts of high pressure fluid to the areas of low pressure where cavitation can occur. This high pressure fluid counteracts the formation of low pressure bubbles of vapour and so reduces or prevents cavitation.

The pressure difference between duct openings on the high pressure side of the blades and the openings on the low pressure side and at the tips of the blades drives the fluid through the ducts.

Where the ducts are connected to the tips of the blades, fluid can also be driven through the channels by the pressure difference between the tips and the high or low pressure side of the blade by the pressure of fluid caused by the centrifugal force coming from the spin of the propeller acting on the fluid in the ducts.

The duct openings on the high pressure side of the blade do not need to be directly adjacent to the openings on the low pressure side nor do they need to be close to the duct openings on the tips of the blade. Different blade designs will require different arrangements so that the high pressure fluid is drawn from the optimum location on the high pressure surface for example.

The ducts or holes do not necessarily need to be circular or uniform along their length. They can be tapered for example. Where the thickness of the blade permits, they can also pass from the high pressure side to the low pressure side at an incline; such incline may also be beneficial to the efficiency of the propeller. Any shape of opening is possible. For example the holes can be circular, rectangular, rhombus, trapezoid, or parallelogram.

The internal shape of the holes can vary along their lengths. For example the shape can be tapered. The inner surfaces of the holes can be serrated.

It has been found that perforating the blade may reduce or eliminate cavitation and also the noise associated with cavitation by up to 17 dB, importantly without materially affecting the efficiency of the blade. The arrangements of holes described below may lead to significant reductions in cavitation volume produced by the propeller, the size of the tip vortices and consequently URN.

Surprisingly and beneficially, it has been found these reductions in noise may occur in the 10 Hz to 1 KHz frequency range, which is considered to be the most harmful to marine life.

In model scale where the model propeller has a diameter of 300 mm, the openings can be 0.5 to 1 mm in diameter. The diameter of the holes will be larger as the model is scaled up for use with a full scale (i.e. full size) propeller. The openings for a full scale propeller of, for example, 4 m to 5 m diameter may be 10 mm to 50 mm in diameter, preferably 15 mm to 40 mm and more preferably 20 mm.

The hole size may be chosen as a function of the diameter of the propeller. For example, the ratio of the diameter of the propeller to the diameter of the holes may be 100-1000, and preferably 200-600. This allows the holes to be scaled to any size of propeller, whilst taking into account the results obtained from the model propeller as set out below.

Holes can be uniformly distributed across part or all of the blade area, and can be all the same size. Alternatively different arrangements of sizes and shapes of holes can be utilized, for example single or multiple bands of smaller holes can be placed along the edge of the blade, followed by bands of larger holes or mixtures of larger and smaller holes. The size and spacing of these holes is arranged to maximize the reduction of cavitation and cavitation noise for a particular blade design. Each blade design will have different arrangements.

Importantly, in order to maintain the efficiency of the blade, the pressure difference between the high pressure and low pressure side of the blade needs to be kept to the optimum with only sufficient reduction of pressure to reduce cavitation and URN.

The reduction in cavitation and URN whilst maintaining efficiency may be achieved because the holes act as turbulators, which are points which induce turbulence in the layer of fluid closest to the surface. During cavitation, laminar flow separates from the propeller surfaces and becomes turbulent, which increases drag due to the presence of eddies. However, turbulators generate turbulent flow which has more drag initially but better adhesion to the surfaces, less eddies and is less prone to separation.

The optimal use of holes (or ducts) in propeller or impeller blades reduces or eliminates cavitation and URN without significantly reducing the blade efficiency. This allows propellers or impeller design to be optimized so that there is no requirement to sub optimally design the propeller or impeller in order to reduce cavitation.

By optimizing the holes it has been found that not only are substantial and beneficial noise reductions achieved but surprisingly these occur in the 10 Hz to 1 kHz range of the noise spectrum, the range which is the most harmful to marine fauna.

The pressure relieving holes are located strategically on the blades areas, where the cavitation presence is dominant, meaning that the associated suction peak and pressure distribution across the blade will be affected most favourably by the introduction of these holes.

A CFD simulation may be used to locate the optimum position and arrangements of holes on the blade. In an example, the simulation uses tip vortex cavitation models and an adaptive mesh generation technique. The model generated provides the ability to predict the extent, volume and dynamics of cavitation on a propeller. Predicting the expected cavitation using the CFD model allows the locations of the holes to be chosen strategically within the cavitation region predicted by the tool. This in turn allows the impact of the holes on the cavitation extent, volume and dynamics to be assessed.

It will be appreciated that the number of chordally extending rows need not be 5 (as set out above), and could be at any suitable fraction of the total radius.

Thus one embodiment of the invention provides an axial flow rotor comprising at least one blade, the blade having a suction surface and a pressure surface which extend from a leading edge to a trailing edge of the blade and a radially-outer tip region, wherein five to one hundred duct openings are provided extending through the at least one blade from the pressure surface to the suction surface, the duct openings being grouped in the tip region of the blade. By providing five to one hundred duct openings in the tip region, the cavitation noise is significantly reduced, while the propeller performance is not significantly affected, and the propeller can be easily manufactured.

Preferably, five to one hundred duct openings per blade are provided. The pattern of duct openings may be repeated in the same way on each blade, or may very between blades.

Preferably, the duct openings are grouped in the radially-outer third of the blade, more preferably the in the radially-outer quarter of the blade, more preferably in the radially-outer fifth of the blade, more preferably in the radially-outer tenth of the blade and more preferably in the radially-outer twentieth of the blade.

Preferably, there are ten to fifty duct openings per blade, and more preferably there are fifteen to twenty five duct openings per blade.

Preferably, the ratio of the diameter of the axial flow rotor to the ratio of the diameter of the duct openings is 100-1000, preferably 200-600.

Preferably, the duct openings have a diameter of 0.5 to 50 mm, preferably 20 mm-40 mm. For small propellers, the duct openings may be correspondingly smaller (e.g. 0.5 mm-3 mm, or 0.6 mm-1 mm as in the tests set out below).

Preferably, the duct openings are grouped into two to five radially-spaced, chordally-extending rows.

Preferably, the rows comprise evenly-spaced duct openings.

Preferably, the rows comprise a combination of evenly-spaced and unevenly-spaced duct openings.

Preferably, the rows comprise spaced pairs of duct openings, the spacing between each of the duct openings of a pair being less than the spacing between neighbouring pairs.

Preferably, the duct openings are grouped spaced from the leading edge of the blade, in the leading two-thirds of the blade, more preferably in the leading half of the blade.

Preferably, the duct closest to the leading edge of the blade in the row of duct openings closest to the tip is further from the leading edge than the duct closest to the leading edge of the blade in the row of duct openings furthest from the tip.

Preferably, the duct furthest from the leading edge of the blade in the row of duct openings closest to the tip is further from the leading edge than the duct furthest from the leading edge of the blade in the row of duct openings furthest from the tip.

Preferably, the axial flow rotor is a propeller comprising five blades, each blade comprising 33 duct openings, wherein the duct openings are grouped in the radially-outer tenth of the blade, and wherein the duct openings are grouped into three radially-spaced, chordally-extending rows.

Preferably, the axial flow rotor is a propeller comprising four blades, each blade comprising 17 to 50 duct openings, wherein the duct openings are grouped in the radially-outer tenth of the blade, and wherein the duct openings are grouped into three radially-spaced, chordally-extending rows.

Preferably, the axial flow rotor is a propeller or an impeller.

According to the invention, there is also provided a mixer or pump comprising the axial flow rotor according to any preceding claim.

The invention will now be described by way of example with reference to the accompanying drawings, in which:

DETAILED DESCRIPTION

Figure 1:
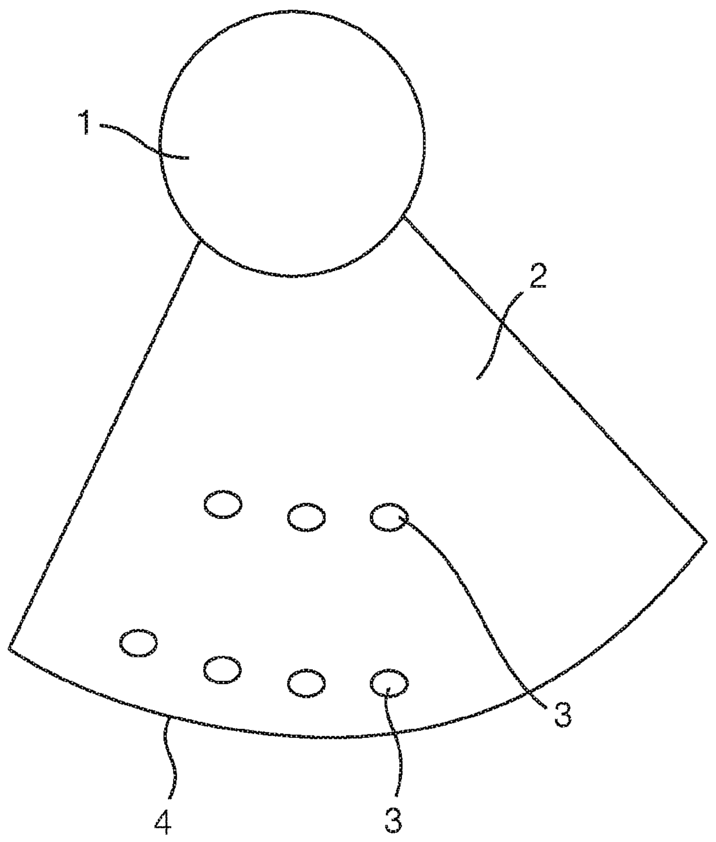
FIG. 1 is a schematic diagram of a propeller according to a first embodiment of the invention.

FIG. 1 shows a single blade 2 attached to the hub 1 of a propeller. Duct openings 3 are shown on the face of the blade 2, generally located in the tip region 4 of the blade. In this embodiment seven relatively large duct openings 3 are shown.

Figure 2A:
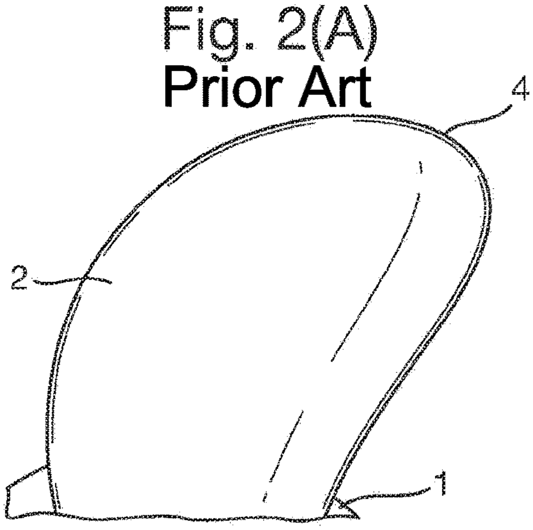
Fig. 2(A) Prior Art
FIG. 2(A) shows a known propeller blade with no duct openings.

FIG. 2 illustrates in FIGS. 2(B) to (E) further embodiments of the invention, compared with a normal, prior art propeller blade illustrated in FIG. 2(A).

Figure 2B:
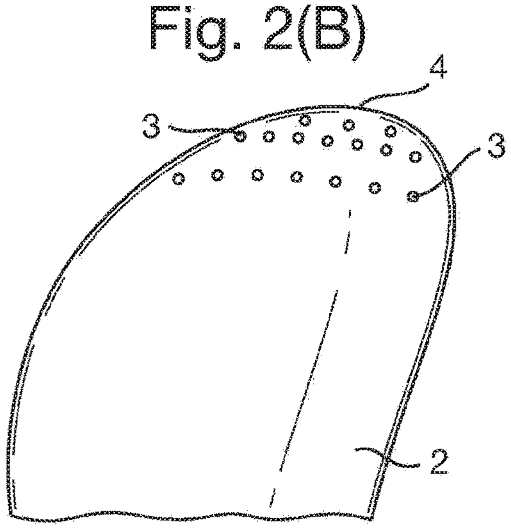
FIGS. 2(B) to (E) show propeller designs according to further embodiments of the invention with a prior art propeller for comparison shown in FIG. 2(A)

In FIG. 2(B) each blade of the propeller has seventeen duct openings in the form of holes 3, each hole being of 1 mm diameter drilled from the pressure side to the suction side of the propeller blade, all positioned in the tip region of the blade 2. As illustrated, the duct openings 3 are arranged in three chordally-extending, radially-spaced rows and are confined to the radially-outer third of the blade, preferably the radially-outer quarter of the blade adjacent to the blade tip 4. In the embodiment illustrated in FIG. 2(B) the outer row consists of three duct openings, with the other two rows each having seven duct openings.

Figure 2C:
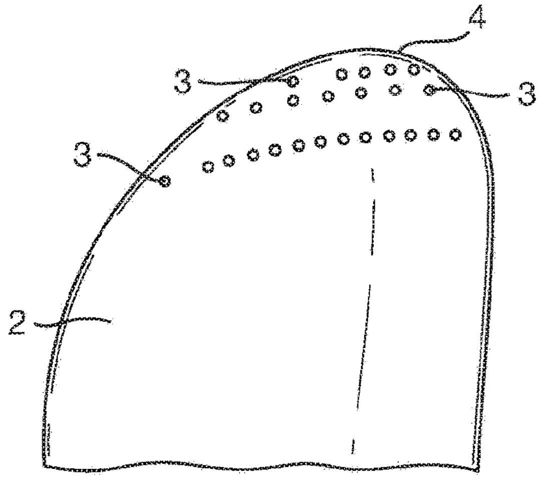

FIG. 2(C) illustrates another embodiment of the invention with twenty-five duct openings, again arranged in three chordally-extending, radially-spaced rows in the tip region of the propeller blade. Again in this embodiment the duct openings are 1 mm in diameter. The radially-outer row has five duct openings, with the other two rows each containing ten duct openings. As illustrated, the rows may comprise a set of equally-spaced duct openings, with one or more unequally-spaced openings, in FIG. 2(C) with the duct opening nearest the leading edge of the first and third rows being spaced an increased distance from the remaining duct openings in the row. As with the FIG. 2(B) embodiment, the duct openings are all confined in the tip region of the blade, that is to say in the radially outer third, or more preferably radially-outer quarter, of the blade.

Figure 2D:
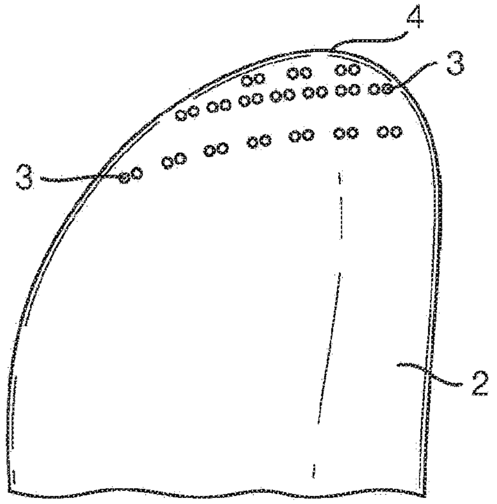
Figure 2E:
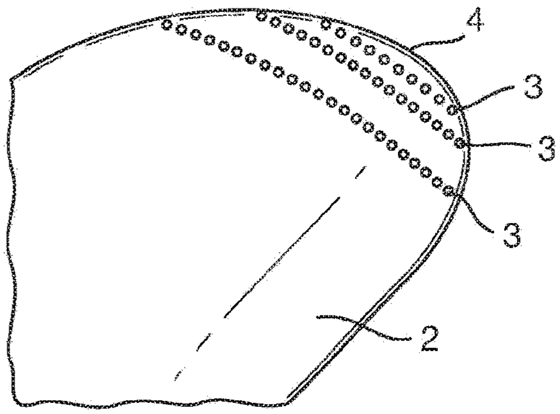

FIG. 2(D) illustrates another embodiment of the invention in which thirty-four duct openings are provided in the tip region of the blade 2. Again, the duct openings 3 are grouped into three chordally-extending, radially-spaced rows and in the radially outer and innermost rows, the duct openings are set in pairs so that the distance between duct openings in a row alternates between a greater and lesser spacing. FIG. 2(E) illustrates another embodiment of the invention in which fifty duct openings are provided in the tip region of a blade 2, again in three radially-spaced, chordally-extending rows with ten duct openings in the radially-outermost row, seventeen in the middle row and twenty-three in the radially innermost row. In this embodiment the duct openings are evenly spaced in the three rows.

In the above embodiments the duct openings are circular of 1 mm diameter, though these embodiments may be modified to use duct openings of 0.5 mm diameter.

Figure 3:
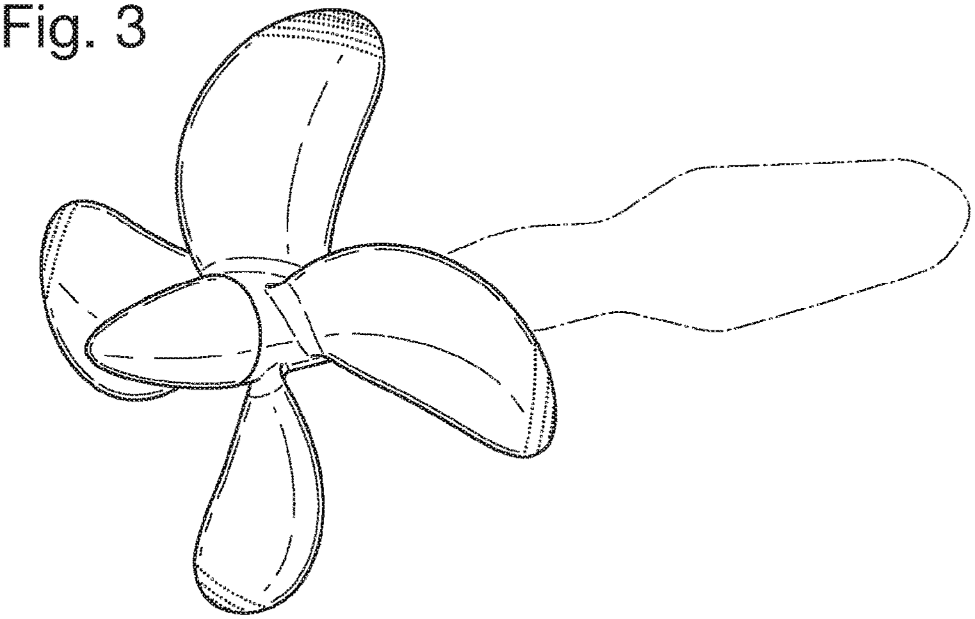
FIG. 3 shows a perspective view of the “Guardian” propeller.

Table 1(a) below illustrates the results of CFD simulations of the propeller blades of FIGS. 2(A) to (E). The propeller was a four-bladed propeller, of the "Guardian" type, the details of which are shown below in Table 1(a). FIG. 3 provides an overall perspective view of this type of propeller, as used in the CFD simulation.

TABLE 1(a)

| | |
|---|---|
| Diameter, D | 350 mm |
| Pitch ratio, P/D | 0.699 |
| Expanded Blade Area Ratio, $A_E/A_O$ | 0.524 |
| Number of blades, Z | 4 |
| Direction of rotation | Right-handed |
| Scale ratio, λ | 19.57 |
| Hub diameter, $D_{hub}$ | 56 mm |

TABLE 1(b)

| | FIG. | | | | |
|---|---|---|---|---|---|
| | 2(A) BASE | 2(B) 17 Holes | 2(C) 25 Holes | 2(D) 34 Holes | 2(E) 50 Holes |
| Thrust (N) | 288.49 | 287.02 | 286.51 | 286.11 | 287.35 |
| Torque (Nm) | 14.78 | 14.83 | 14.72 | 14.73 | 15.10 |
| Cavitation Volume ($m^3$) | 2.15E−06 | 2.05E−06 | 1.98E−06 | 1.93E−06 | 1.84E−06 |
| Efficiency | 58.70% | 58.21% | 58.56% | 58.44% | 57.24% |
| Δ % Thrust | | −0.51% | −0.69% | −0.82% | −0.39% |
| Δ % Torque | | 0.32% | −0.45% | −0.39% | 2.14% |
| Efficiency Loss (%) | | 0.48% | 0.14% | 0.25% | 1.46% |
| Δ % Cavitation Volume | | −4.44% | −8.03% | −10.42% | −14.58% |

It can be seen from Table 1(b) that the presence of the duct openings in the tip region does not detract substantially from the thrust and torque performance of the propeller, nor from its efficiency. However, significant reductions in cavitation volume are achieved of between 4% and 15%.

Figure 4A:
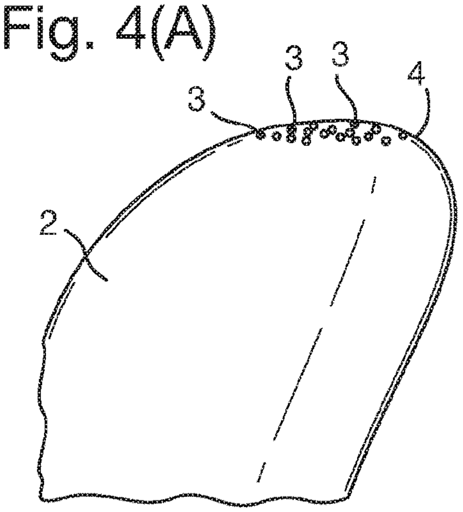
FIGS. 4(A) to (D) are schematic diagrams of four further embodiments of the invention.
Figure 4B:
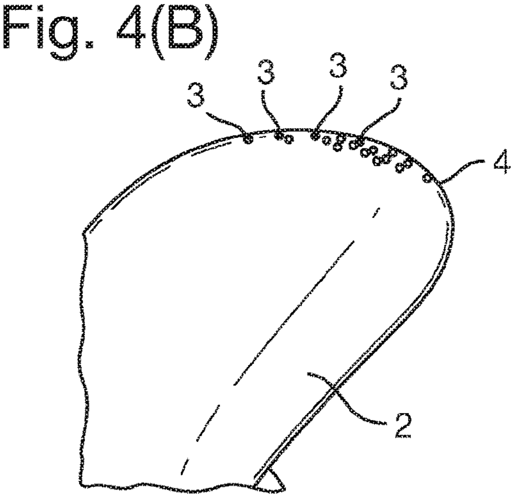
Figure 4C:
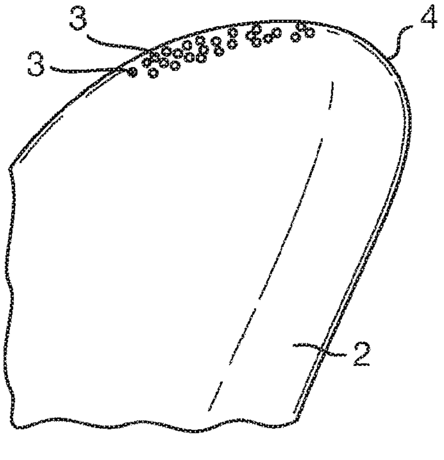
Figure 4D:
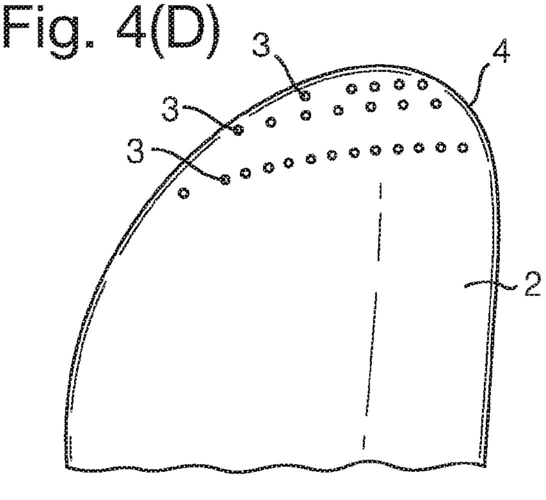

FIGS. 4(A) to (D) illustrate further alternative embodiments of the invention. In FIG. 4(A) seventeen circular duct openings of 1 mm diameter are positioned in the tip region of the blade, and in a group in the leading half of the blade. Thus the duct openings are grouped in the radially outer quarter, or more preferably radially outer fifth of the blade, and in the leading two-thirds of the region of the blade tip. In FIG. 4(B) the duct openings 3 are again in the leading part of the tip region, but the group extends further around the leading edge. The embodiment of FIG. 4(C) has a group of twenty-five duct openings in the leading half of the tip region and the embodiment of FIG. 4(D) has a group of twenty-five duct openings spread across tip region of the blade.

The following results were obtained by CFD simulations of the four arrangements shown in FIG. 4(A) to 4(D), and are compared to a CFD simulation of the same propeller with no duct openings (referred to as "BASE" in Table 1). The CFD simulations used a STAR-CCM+ finite volume stress solver, Detached Eddy Simulation (DES) and a Schnerr-Sauer cavitation model. The propeller was the "Guardian" type propeller, the details of which are set out in Table 1(a) above.

TABLE 2

| | FIG. | | | | |
|---|---|---|---|---|---|
| | BASE | 4(A) | 4(B) | 4(C) | 4(D) |
| Thrust (N) | 290.57 | 290.76 | 288.93 | 288.05 | 288.58 |
| Torque (Nm) | 14.78 | 14.86 | 14.79 | 14.78 | 14.72 |
| Cavitation Volume ($m^3$) | 2.44E−06 | 2.10 E−06 | 2.32 E−06 | 2.27 E−06 | 2.26 E−06 |
| Efficiency | 51.93% | 58.84% | 58.76% | 58.63% | 58.96% |
| Δ % Thrust | | 0.07% | −0.57% | −0.87% | −0.68% |
| Δ % Torque | | 0.57% | 0.07% | −0.01% | −0.40% |
| Efficiency Loss (%) | | 0.50% | 0.64% | 0.86% | 0.29% |
| Δ % Cavitation Volume | | −13.83% | −4.71% | −6.92% | −7.09% |

It can be seen from Table 2 that, in all of the embodiments illustrated in FIG. 4, a significant decrease in cavitation is observed, with only a small decrease in thrust, torque and efficiency.

Figure 5A:
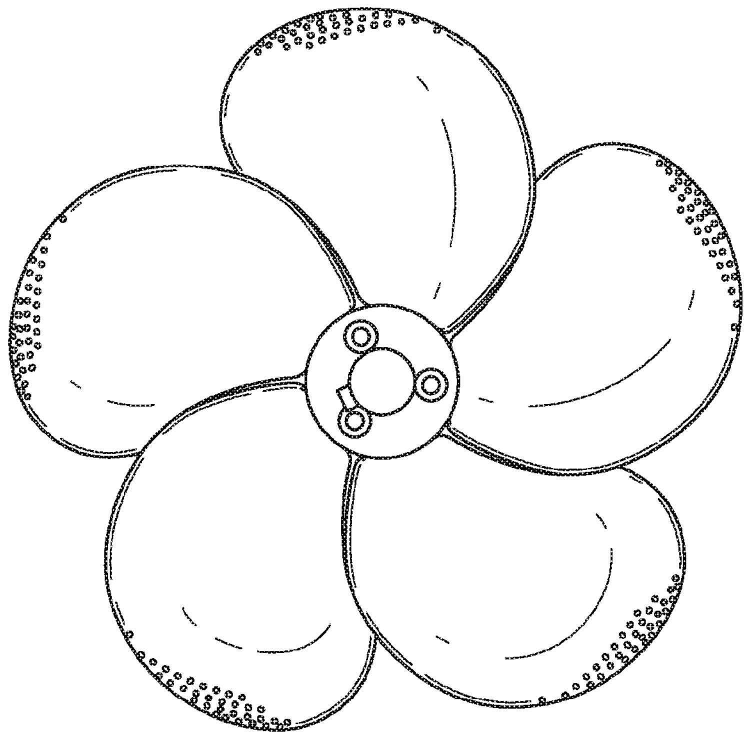
FIG. 5(A) shows a propeller with five blades, each with four rows of radially-spaced, chordally-extending rows.
Figure 5B:
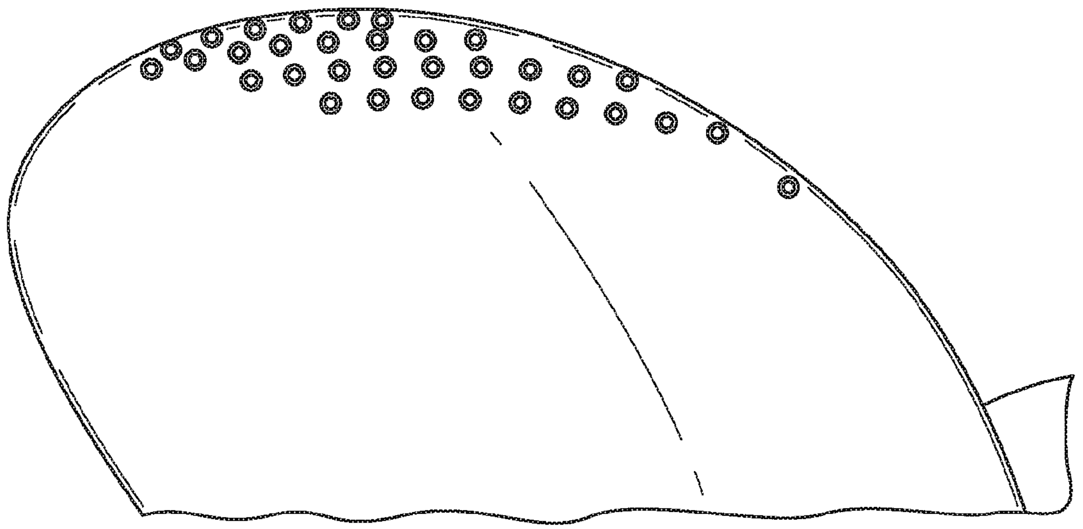
FIG. 5(B) shows a close up of the tip region of the propeller of FIG. 6 (A)

FIGS. 5A and 5B illustrate a further embodiment of the invention, in which a propeller comprising five blades is provided with thirty-three duct openings in the tip region of each blade. The duct openings 3 are arranged in four chordally-extending, radially-spaced rows and are confined to the radially-outer third of the blade, preferably the radially-outer quarter of the blade adjacent to the blade tip 4.

The propeller is the "Princess Royal" propeller, which is a subcavitating propeller (i.e. the majority of the blade area operates under cavitating conditions, and is hence prone to noise). This propeller is the benchmark propeller for carrying out noise trials, and is recognised as such by the Specialist Committee on Hydrodynamic Noise in the 28th ITTC (International Towing Tank Conference).

In this embodiment, the duct closest to the leading edge of the blade in the row of duct openings closest to the tip is further from the leading edge than the duct closest to the leading edge of the blade in the row of duct openings furthest from the tip. Likewise, the duct furthest from the leading edge of the blade in the row of duct openings closest to the tip is further from the leading edge than the duct furthest from the leading edge of the blade in the row of duct openings furthest from the tip. In other words, the row of ducts which is radially innermost is positioned closer to the leading edge of the blade than the row of ducts which is radially outermost. The rows in between the radially innermost and outermost rows are positioned such that the position of the duct closest to the leading edge is between that of the radially innermost and outermost rows.

Figure 6:
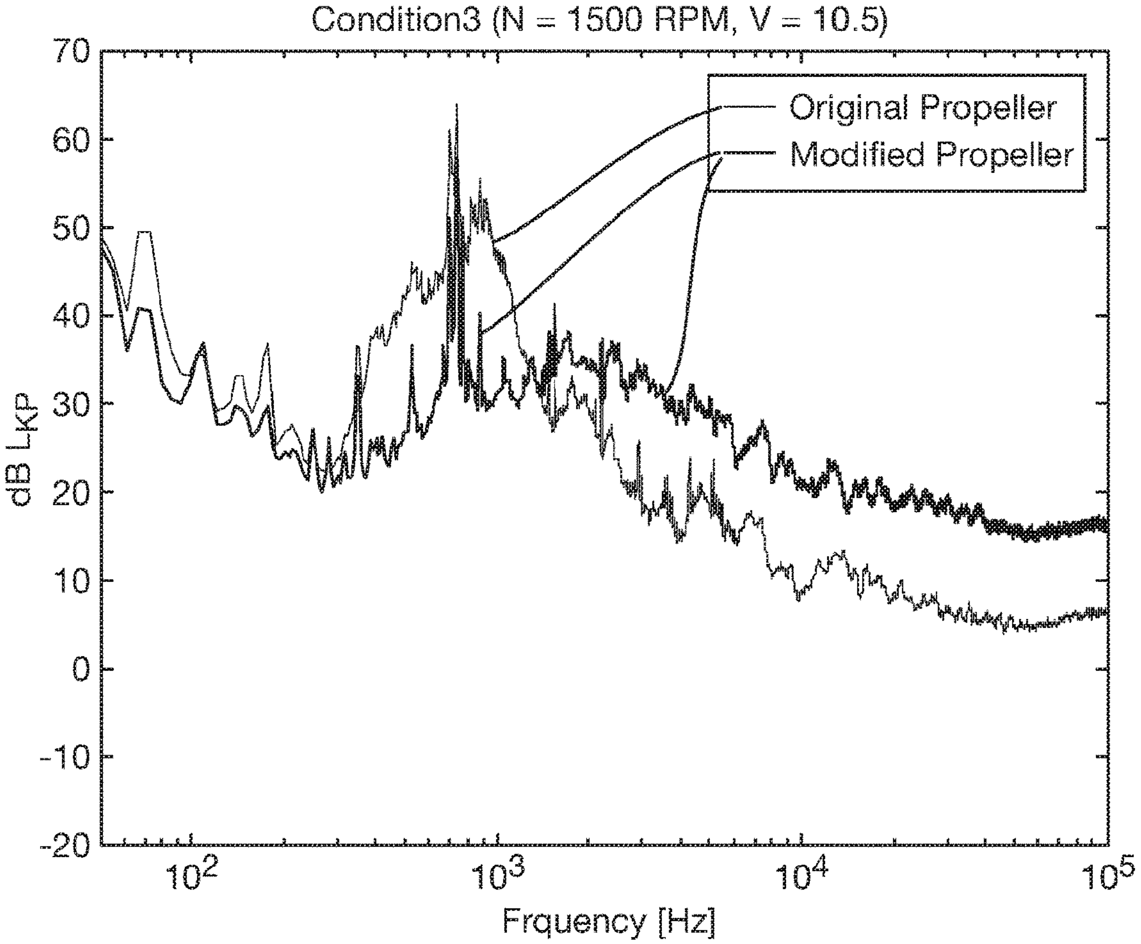
FIG. 6 shows an experimentally obtained graph of noise against frequency produced by the propeller of FIGS. 5A and 5B, compared to a propeller with no ducts.
Figure 7A:
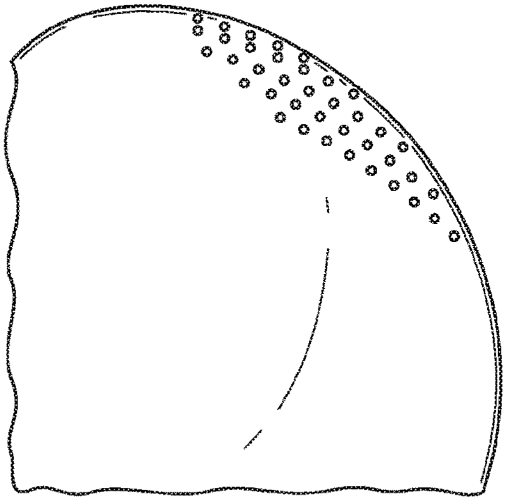
FIGS. 7(A) to 7(F) show six further embodiments of the invention.
Figure 7B:
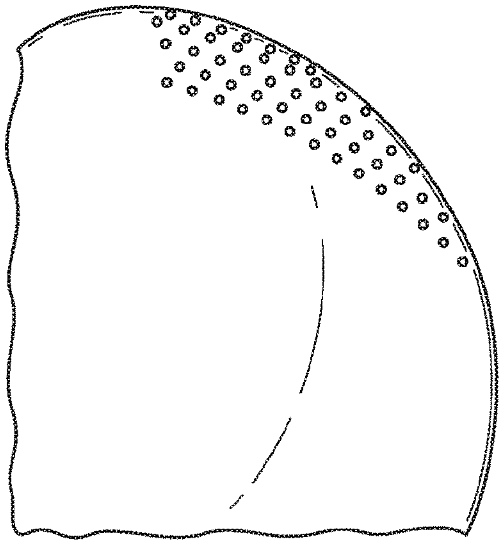
Figure 7C:
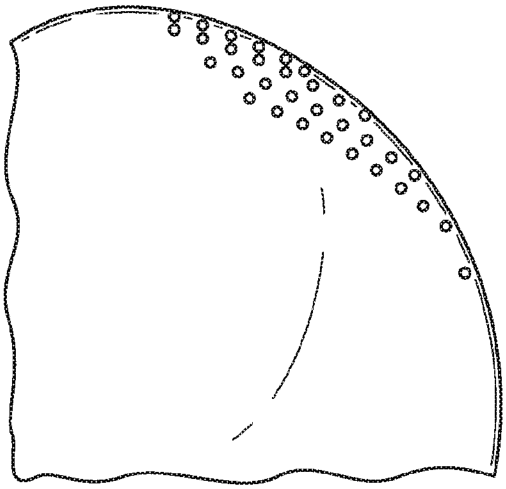
Figure 7D:
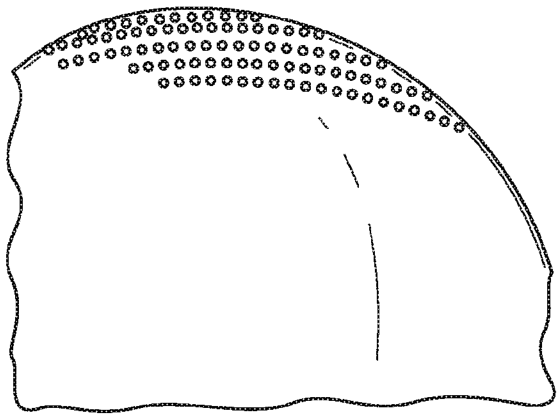
Figure 7E:
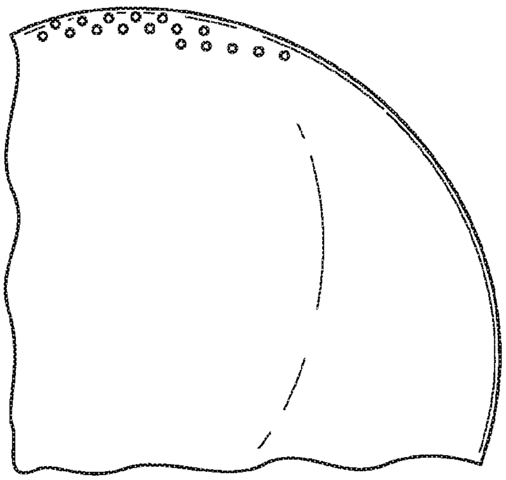
Figure 7F:
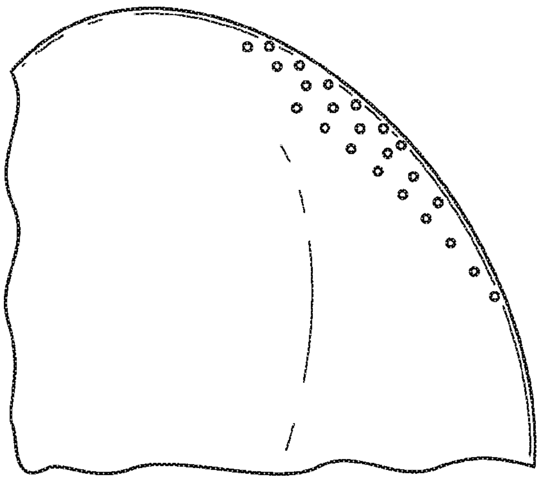

FIG. 6 shows the noise produced at various frequencies by a propeller as shown in FIGS. 5A and 5B ("Modified Propeller"), and by a propeller identical to that of FIGS. 5A and 5B but without any ducts ("Original Propeller"—i.e.

solid blades). These tests were carried out in a water tank with a vessel speed of 10.5 and 15.1 kn that corresponds to engine rotational speed of 1500 RPM and 2000 RPM respectively with a reduction gear ratio of 1.75, thus mirroring the conditions used in a typical ship propeller.

In FIG. 6, it can be seen that, for frequencies from 10 Hz to just over 10 kHz, the noise produced by the "Modified Propeller" (i.e. a propeller according to the arrangement of FIGS. 5A and 5B) is lower than that of the "Original Propeller". These are the noise frequencies which are typically most harmful to marine life. For some frequencies, the reduction is of the order of 15-20 dB. Although the noise at higher frequencies is higher for the "Modified Propeller" than for the "Original Propeller", these higher frequencies are of less concern so an increase in noise at these frequencies is acceptable, given that the noise at lower, more harmful frequencies is being reduced.

FIGS. 7A to 7F show further variations of the embodiment shown in FIGS. 5A and 5B. Each variation has a different number of holes (i.e. duct openings) and/or size of holes drilled in the tip region, in the radially outermost 10% of the blade. The number of holes and hole diameter for each embodiment is set out in Table 3 below. Table 3 also shows the results for each embodiment when tested in a water tank. The "BASE" propeller is the same propeller with no ducts (i.e. the same as the "Original propeller" referred to in relation to FIGS. 5 and 6 above).

TABLE 3

| Figure | BASE | 7(A) | 7(B) | 7(C) | 7(D) | 7(E) | 7(F) |
|---|---|---|---|---|---|---|---|
| Number of holes | n/a | 41 | 60 | 33 | 92 | 17 | 23 |
| Hole diameter (mm) | n/a | 1.0 | 1.0 | 1.0 | 0.6 | 1.0 | 1.0 |
| Thrust (N) | 586.64 | 578.71 | 574.94 | 578.86 | 579.59 | 582.04 | 580.96 |
| Torque (Nm) | 17.11 | 17.95 | 18.16 | 17.79 | 17.77 | 17.47 | 17.60 |
| Cavitation Volume ($m^3$) | 8.11E−06 | 6.02E−06 | 5.14E−06 | 6.47E−06 | 6.17E−06 | 7.18E−06 | 6.89E−06 |
| Efficiency | 61.38% | 57.73% | 56.69% | 58.24% | 58.41% | 59.67% | 59.09% |
| Δ % Thrust | | −1.35% | −1.99% | −1.33% | −1.20% | −0.78% | −0.97% |
| Δ % Torque | | 4.89% | 6.11% | 3.99% | 3.82% | 2.06% | 2.87% |
| Efficiency Loss (%) | | 5.95% | 7.64% | 5.11% | 4.84% | 2.79% | 3.73% |
| Δ % Cavitation Volume | | −25.77% | −36.67% | −20.19% | −23.97% | −11.5% | −15.04% |

It can be seen that each of the above configurations results in a significant decrease in cavitation volume, with a much smaller decrease in thrust and efficiency. Further, the loss in thrust is offset by an increase in torque.

It will be appreciated that the number of ducts in each blade need not be the same, or that one or more of the blades may not include any ducts. For example, the ducts could be provided on only one of the blades of the propeller, or on a subset of the blades.

It will also be appreciated that the axis of the ducts may be in any direction through the blade. For example, it may be normal to the blade mean line, it may be parallel to the axis of the shaft to which the propeller is mounted, or at any other suitable angle.

Although the above embodiments illustrate propeller designs with particular numbers of duct openings in particular rows or arrangements, the precise number is not critical and can be varied. Thus the distribution of the duct openings between the rows, and the number of rows can be varied without substantially affecting the performance.

It will also be noted that different types of axial flow device may be designed to work in different fluids. For example, an impeller which is used in a pump may be used to pump a fluid with a viscosity different to that of water, which may require a different size of duct opening to be used. A higher viscosity of fluid may require a larger size of duct opening (hole).

The above embodiments are described to illustrate the invention, and are not intended to be limiting. The skilled person will be readily able to devise alternative embodiments without departing from the scope of the claims.

The invention claimed is:

1. An axial flow rotor configured to accelerate a flow of a liquid while reducing cavitation thereof, the axial flow rotor characterized as a selected one of a propeller, an impeller for a pump, or an impeller for a mixer, the axial flow rotor comprising:

a blade having a suction surface and a pressure surface each of which extend from a leading edge to a trailing edge of the blade and a radially-outer tip region, the radially-outer tip region being a radially-outer third of the blade adjacent to a blade tip of the blade, and the suction surface generating a lower pressure in the flow of the liquid adjacent the suction surface and the pressure surface generating a higher pressure in the flow of the liquid adjacent the pressure surface, wherein:

the blade comprises a plurality of duct openings each extending through the blade from the pressure surface to the suction surface, the duct openings being limited to and disposed in the radially-outer tip region of the blade, the plurality of duct openings being from five (5) to fifty (50) arranged into two (2) to five (5) radially-spaced, chordally-extending rows, and the duct opening of the plurality of duct openings closest to the leading edge of the blade in the row of the duct openings closest to the blade tip is further from the leading edge than the duct opening of the plurality of duct openings closest to the leading edge of the blade in the row of duct openings furthest from the blade tip.

2. An axial flow rotor according to claim 1, wherein the blade is a first blade affixed to and radially extending from a central hub, and the axial flow rotor further comprises a second blade adjacent the first blade affixed to and radially extending from the central hub, the second blade having no duct openings extending through the second blade from opposing pressure and suction surfaces thereof.

3. An axial flow rotor according to claim 1, wherein the duct openings are each aligned along a duct axis opening that is skewed with respect to a rotor axis about which the blade rotates.

4. An axial flow rotor according to claim 1, wherein the duct openings are limited to within a radially-outer tenth of the blade.

5. An axial flow rotor according to claim 1, wherein the duct openings are limited to within a radially-outer twentieth of the blade.

6. An axial flow rotor according to claim 1, wherein the number of duct openings is from ten (10) to fifty (50).

7. An axial flow rotor according to claim 1, wherein the blade is a first blade, the axial flow rotor further comprises a second blade with the first and second blades rotatable about a central axis and defining an outermost diameter of the rotor, each of the plurality of duct openings having an outermost duct opening diameter, and a ratio of the outermost diameter to the outermost duct opening diameter being from between 100:1 to about 1000:1.

8. An axial flow rotor according to claim 1, wherein the duct openings each have a diameter of from 0.5 mm to 50 mm.

9. An axial flow rotor according to claim 1, wherein the duct openings are arranged into at least one of: even spacing of the duct openings; a combination of even spacing and uneven spacing of the duct openings; or spaced pairs of the duct openings, the spacing between each of the duct openings of a pair of the spaced pairs being less than the spacing between neighbouring pairs of the spaced pairs.

10. An axial flow rotor according to claim 1, wherein the duct openings each have the same internal diameter.

11. An axial flow rotor according to claim 1, wherein the axial flow rotor is a propeller comprising five (5) blades including the blade, each of the five (5) blades comprising thirty-three (33) of the duct openings, wherein the duct openings are grouped in the radially-outer tenth of each of the five blades, and wherein the duct openings are grouped into three radially-spaced, chordally-extending rows.

12. An axial flow rotor according to claim 1, wherein the axial flow rotor is a propeller comprising four (4) blades including the blade, each of the four (4) blades comprising seventeen (17) to fifty (50) of the duct openings, wherein the duct openings are grouped in the radially-outer tenth of each of the four (4) blades, and wherein the duct openings are grouped into three (3) radially-spaced, chordally-extending rows.

13. An axial flow rotor, comprising:

a central hub rotatable about a central axis; and a plurality of blades affixed to and extending radially from the central hub, wherein each of the plurality of blades comprises:

a leading edge;

a trailing edge;

a blade tip opposite the central hub;

a suction surface that extends between the leading edge and the trailing edge to the blade tip;

a pressure surface opposite the suction surface that extends between the leading edge and the trailing edge to the blade tip; and a plurality of duct openings fluidically interconnecting the pressure surface and the suction surface through a thickness of the blade to reduce cavitation effects in a flow of a liquid established during rotation of the axial flow rotor, the plurality of duct openings being a number from five (5) to fifty (50) duct openings, the plurality of duct openings arranged in two (2) to five (5) radially-spaced, chordally-extending rows adjacent the blade tip, wherein the duct openings are retained within a radially-outer tip region of the blade and the duct opening of duct openings closest to the leading edge of the blade in the row of the duct openings closest to the blade tip is further from the leading edge than the duct opening of duct openings closest to the leading edge of the blade in the row of duct openings furthest from the blade tip, the radially-outer tip region being a radially-outer third of the blade adjacent to the blade tip.

14. An axial flow rotor of claim 13, characterized as a selected one of a marine propeller, an impeller for a pump, or an impeller for a mixer.

15. An axial flow rotor of claim 13, wherein the plurality of blades define a first diameter of the rotor extending through the central hub, a largest duct opening of the plurality of duct openings has a second diameter, and a ratio of the first diameter to the second diameter is from 100:1 to 1000:1.

16. An axial flow rotor of claim 13, wherein the plurality of duct openings each have the same diameter.

17. An axial flow rotor according to claim 13, wherein the blade comprises ten (10) to fifty (50) duct openings.

18. An axial flow rotor configured to accelerate a flow of a liquid while reducing cavitation thereof, the axial flow rotor characterized as a selected one of a propeller, an impeller for a pump, or an impeller for a mixer, the axial flow rotor comprising:

a blade having a suction surface and a pressure surface each of which extend from a leading edge to a trailing edge of the blade and a radially-outer tip region, the radially-outer tip region being a radially-outer third of the blade, and the suction surface generating a lower pressure in the flow of the liquid adjacent the suction surface and the pressure surface generating a higher pressure in the flow of the liquid adjacent the pressure surface, wherein:

the blade comprises a plurality of duct openings each extending through the blade from the pressure surface to the suction surface, the duct openings being limited to and disposed in the radially-outer tip region of the blade, the plurality of duct openings being from five (5) to fifty (50) arranged into two (2) to five (5) radially-spaced, chordally-extending rows, and the duct opening of the plurality of duct openings furthest from the leading edge of the blade in the row of the duct openings closest to the blade tip is further from the leading edge than the duct opening of the plurality of duct openings furthest from the leading edge of the blade in the row of the duct openings furthest from the blade tip.

19. An axial flow rotor according to claim 18, wherein the blade comprises ten (10) to fifty (50) duct openings.

20. An axial flow rotor, comprising:

a central hub rotatable about a central axis; and a plurality of blades affixed to and extending radially from the central hub, wherein each of the plurality of blades comprises:

a leading edge;

a trailing edge;

a blade tip opposite the central hub;

a suction surface that extends between the leading edge and the trailing edge to the blade tip;

a pressure surface opposite the suction surface that extends between the leading edge and the trailing edge to the blade tip; and five (5) to fifty (50) duct openings fluidically interconnecting the pressure surface and the suction surface through a thickness of the blade to reduce cavitation effects in a flow of a liquid established during rotation of the axial flow rotor, the duct openings arranged into two (2) to five (5) radially-spaced, chordally-extending rows adjacent the blade tip, wherein the duct openings are retained within a radially-outer tip region of the blade and the duct opening of the duct openings furthest from the leading edge of the blade in the row of the duct openings closest to the blade tip is further from the leading edge than the duct opening of the duct openings furthest from the leading edge of the blade in the row of the duct openings furthest from the blade tip, and the radially-outer tip region being a radially-outer third of the blade adjacent to the blade tip.

21. An axial flow rotor according to claim 20, wherein the blade comprises ten (10) to fifty (50) duct openings.

* * * * *